(12) United States Patent
Borkholder

(10) Patent No.: US 11,919,342 B1
(45) Date of Patent: Mar. 5, 2024

(54) GOOSENECK PUCK EXTENDER

(71) Applicant: Gen-Y Creations, LLC, Nappanee, IN (US)

(72) Inventor: Carl J. Borkholder, Nappanee, IN (US)

(73) Assignee: GEN-Y Creations, LLC, Nappanee, IN (US)

( * ) Notice: Subject to any disclaimer, the term of this patent is extended or adjusted under 35 U.S.C. 154(b) by 0 days.

(21) Appl. No.: 18/388,227

(22) Filed: Nov. 9, 2023

Related U.S. Application Data

(63) Continuation of application No. 17/410,041, filed on Aug. 24, 2021, now Pat. No. 11,858,302.

(51) Int. Cl.
*B60D 1/07* (2006.01)
*B60D 1/52* (2006.01)
*B60D 1/02* (2006.01)
*B60D 1/06* (2006.01)

(52) U.S. Cl.
CPC ............. *B60D 1/075* (2013.01); *B60D 1/52* (2013.01); *B60D 1/025* (2013.01); *B60D 1/065* (2013.01)

(58) Field of Classification Search
CPC ................................ B60D 1/52; B60D 1/075
See application file for complete search history.

(56) References Cited

U.S. PATENT DOCUMENTS

| | | | |
|---|---|---|---|
| 8,876,142 B1 * | 11/2014 | Karasch | B60D 1/075 280/495 |
| 9,248,714 B2 | 2/2016 | Karasch et al. | |
| 9,849,738 B2 | 12/2017 | Guthard et al. | |
| 10,987,982 B2 | 4/2021 | Fritz et al. | |
| 11,602,960 B2 | 3/2023 | Choquette | |
| 2022/0111690 A1 | 4/2022 | Scruggs | |

* cited by examiner

*Primary Examiner* — Kevin Hurley
(74) *Attorney, Agent, or Firm* — Sanders Pianowski LLP

(57) ABSTRACT

A gooseneck ball extender is designed to mate with a center socket and receivers mounted to a towing vehicle and provide a gooseneck bell that is offset from the center socket. The extender has a cylindrical shaft with captured balls that can be moved between a retracted position and an extended position through a spring-loaded locking shaft that moves between an unlocked and locked position. The locking shaft is biased towards the locked position where the captured balls are extended. The extender has an outrigger portion that has puck locks. The puck locks are rotatable between a locked position and an unlocked position. As attached to the towing vehicle, the outrigger portion provides additional support to the gooseneck ball.

19 Claims, 7 Drawing Sheets

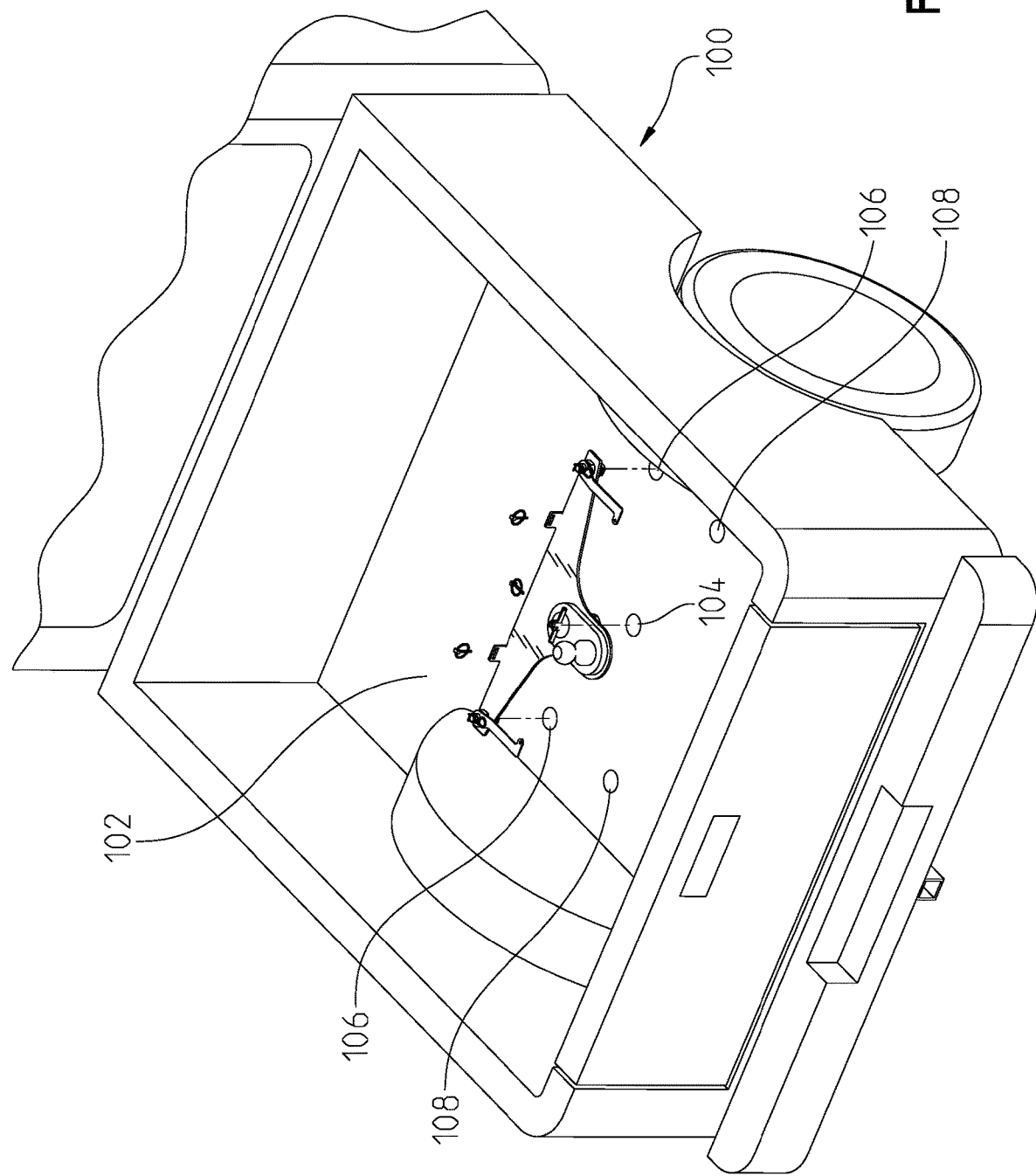

GOOSENECK PUCK EXTENDER

CROSS REFERENCE TO RELATED APPLICATIONS

Figure 1:
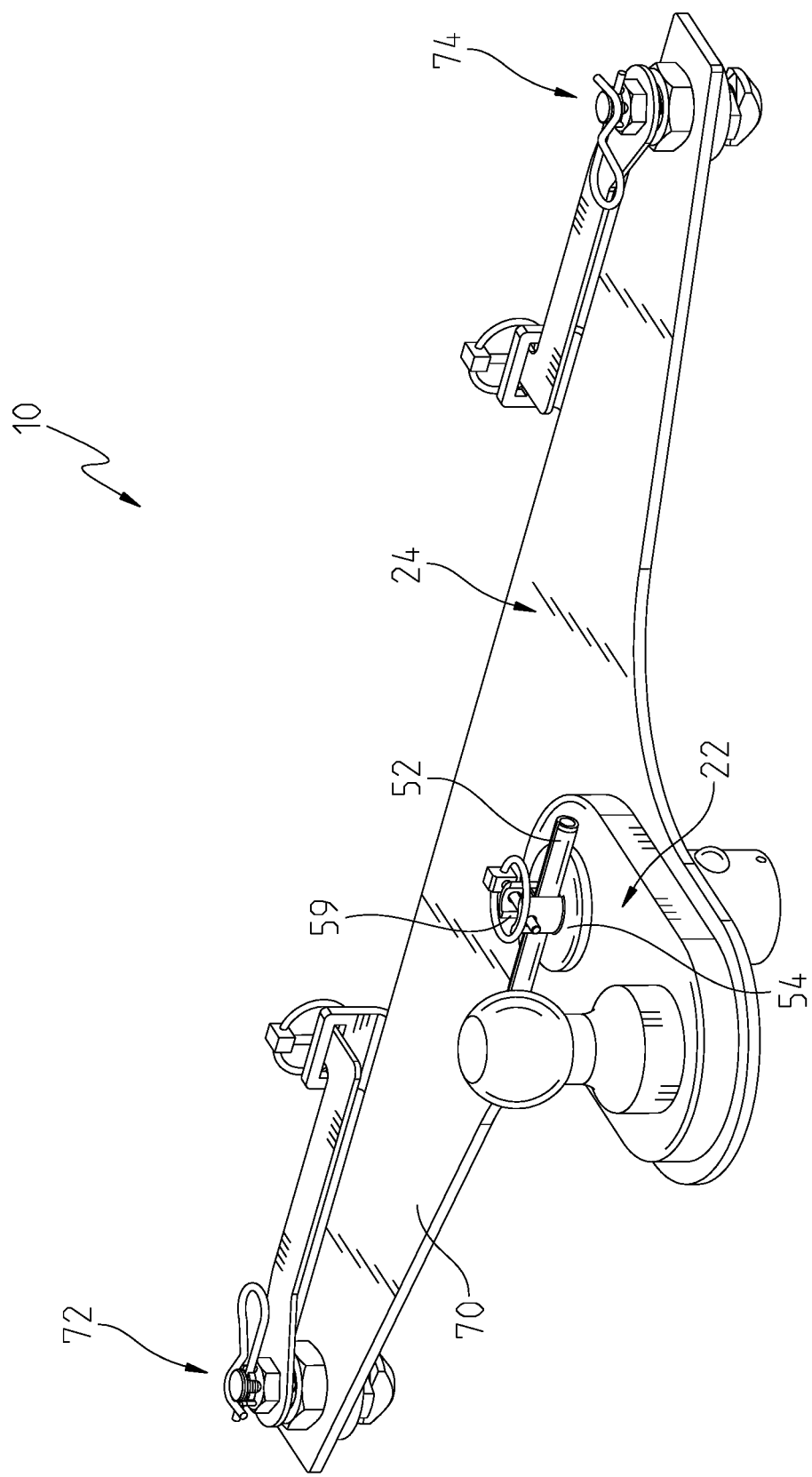

This application is a Continuation of U.S. application Ser. No. 17/410,041 filed Aug. 24, 2021, the disclosure of which is incorporated by reference.

BACKGROUND OF THE INVENTION

This present disclosure relates to towing adapters and accessories, in particular medium and heavy-duty trailer towing adapters that uses a truck bed-mounted attachment. Truck bed "puck" mounting systems have become commonplace for connecting towing attachments on trucks. A "puck" system is either a factory installed or aftermarket device that provides frame-mounted attachment points that are accessible through the floor of the truck bed. Most puck systems have a center socket that is centered over the truck's axle along with four other receivers that are spaced around the center socket. The center socket is adapted for receiving a straight gooseneck ball that protrudes directly out of the center socket when it is locked into place. Puck systems are an excellent and convenient way to attach fifth wheel receivers, gooseneck balls, safety books, and other towing components, but their location is fixed. When towing with a short bed truck or truck bed-mounted toolbox, space between the trailer and truck may be insufficient to turn or properly navigate. The same interference problem between the truck and trailer can occur when the trailer has a large overhang on the front. Some have tried to solve this problem by using an offset gooseneck ball that only fits into the center socket. Currently available offset gooseneck balls rely solely on the single attachment through the center socket and therefore, place their load only on the center socket. This creates a single failure point to the vehicle chassis. The center socket in the vehicle is not intended to withstand significant torsional forces resulting from the use of an offset gooseneck ball. In addition to the vehicle's center socket being ill equipped to handle the forces generated by an offset gooseneck ball, using such an adapter would transmit all torsion to the locking mechanism, which is also not intended to withstand significant torsion forces. The existing solutions poorly distribute their load onto the center socket which can become loose under such an unintended loading scenario. This can result in a significant safety issue through a potential catastrophic failure. Even absent such a catastrophic failure, an offset gooseneck could cause noise and difficulty towing. An improved solution is needed that more evenly distributes towing loads.

SUMMARY OF THE INVENTION

The present disclosure describes an improved puck-mounted offset gooseneck bell that is secured to the centrally-located socket and also includes an outrigger portion of a base plate that simultaneously connects to forwardly-located puck receivers. The present invention more evenly distributes towing loads when compared to existing offset gooseneck bell adapters that rely solely on the center socket on the towing vehicle. Safety chain hooks are typically used in the rearward receivers, leaving the forward receivers open. An offset gooseneck adapter is for use with a towing vehicle puck system having a center socket and receivers spaced from the center socket. The adapter has a central connection portion with a cylindrical shaft having a cylindrical surface, the central connection portion has at least one captured ball moveable between an extended position and a retracted position by a locking shaft. The locking shaft is moveable on a vertical axis between a locked position and an unlocked position. The extended position is defined by a portion of the captured ball displaced radially beyond the cylindrical surface by the locking shaft. The retracted position is defined by the captured ball radially moveable to a position where it does not protrude beyond the cylindrical surface. The adapter has an offset gooseneck portion affixed to the central connection portion. The offset gooseneck portion has a gooseneck ball spaced from the cylindrical shaft. To add stability to the central connection and gooseneck portions, the baseplate of the adapter includes an outrigger portion that is affixed to the offset gooseneck portion. The outrigger portion of the base plate has rotating locks with each rotating lock having its own rotatable T-shaped bolt. The T-shaped bolt is spaced from the cylindrical shaft by a distance equal to the distance between the center socket and receivers on the towing vehicle. The rotating locks are lockable with a locking handle fixed with respect to the T-shaped bolt and can rotate between locked and unlocked positions.

To install the adapter to the towing vehicle, the user first removes any dust covers that may be present over the center socket and receivers located forward of the center socket. The user removes any locking pins on the locking handles and moves the locking handles to the unlocked position, which positions the T-shaped bolts to be received by the fore receivers. The user then removes any locking pin on the cylindrical shaft and moves the locking shaft to the unlocked position. At this time, the user insects the T-shaped bolts and cylindrical shaft into the fore receivers and center socket respectively. The user then moves the locking handles to the locked position and the locking pin to the locked position. The locking pins are then installed on the locking handles and cylindrical shaft.

BRIEF DESCRIPTION OF TIE DRAWINGS

Figure 2:
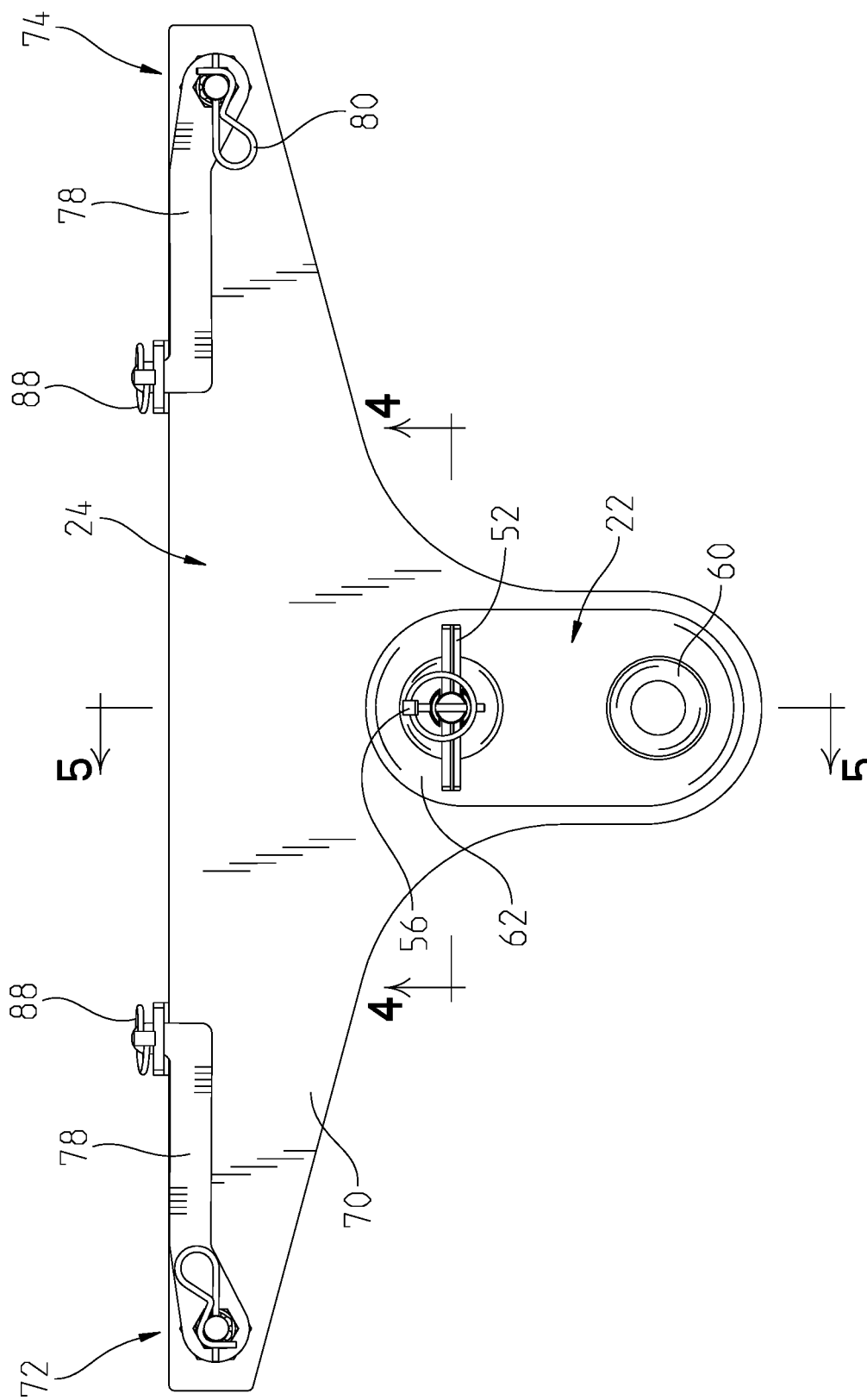
Figure 3:
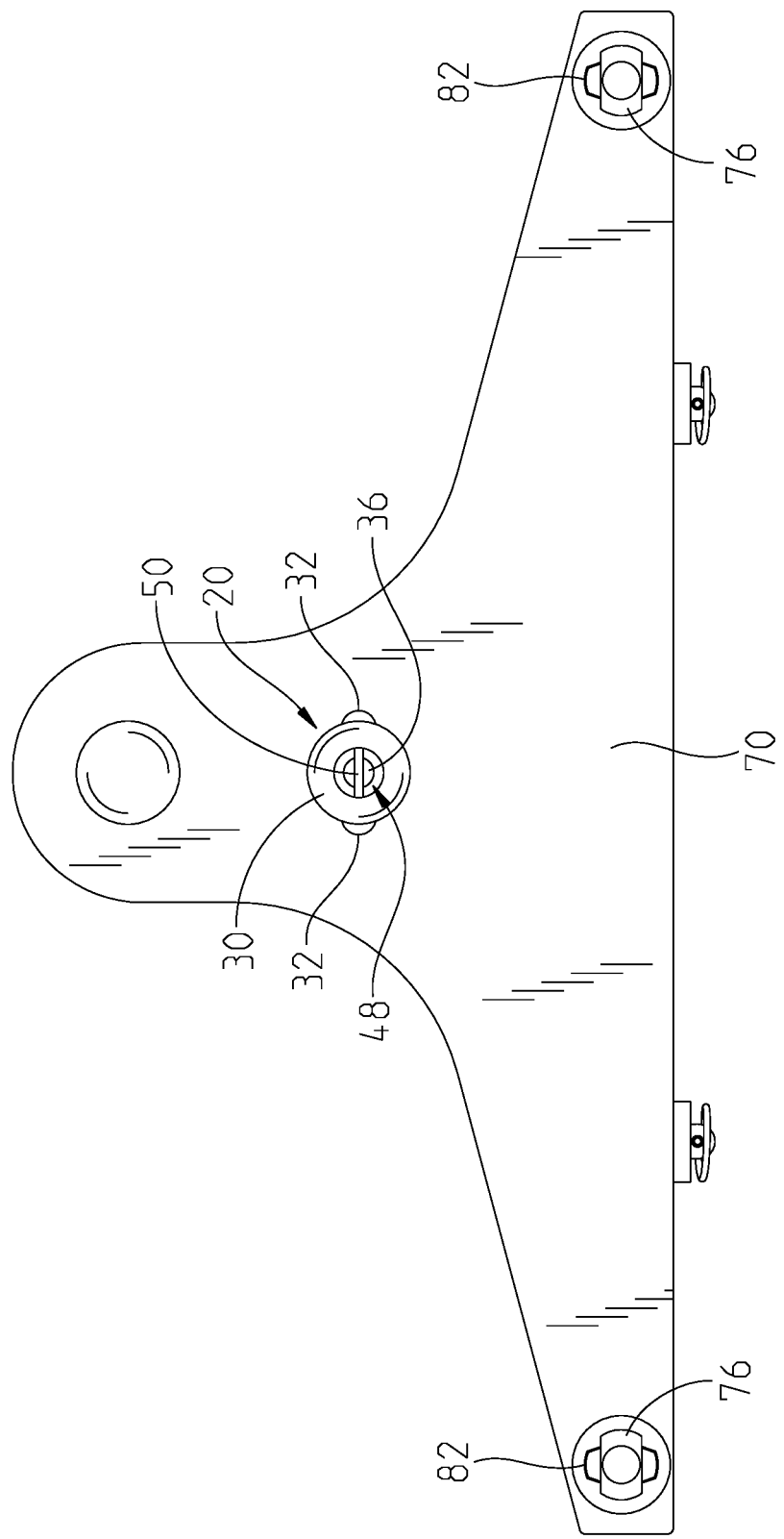
Figure 4:
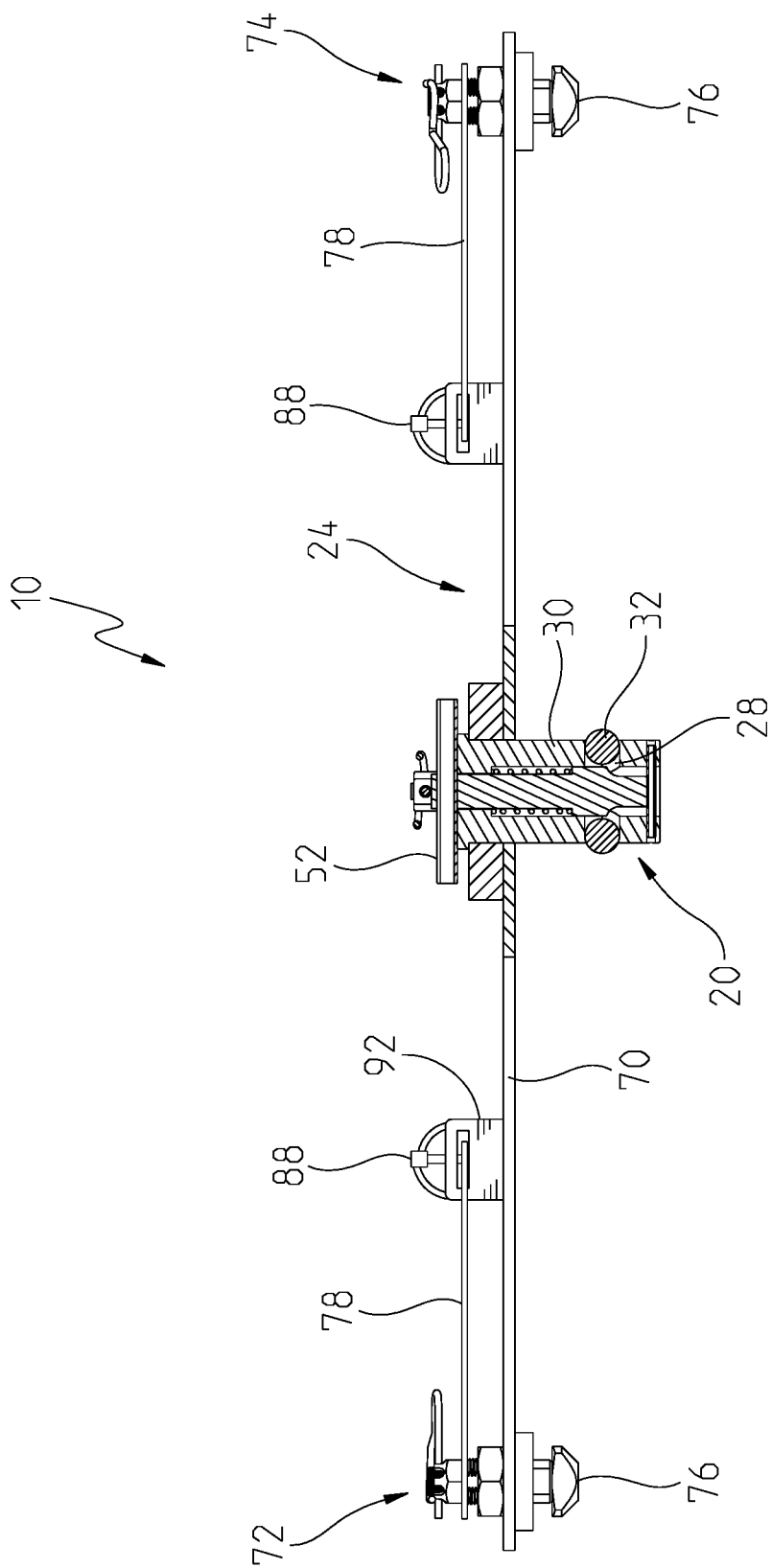
Figure 5:
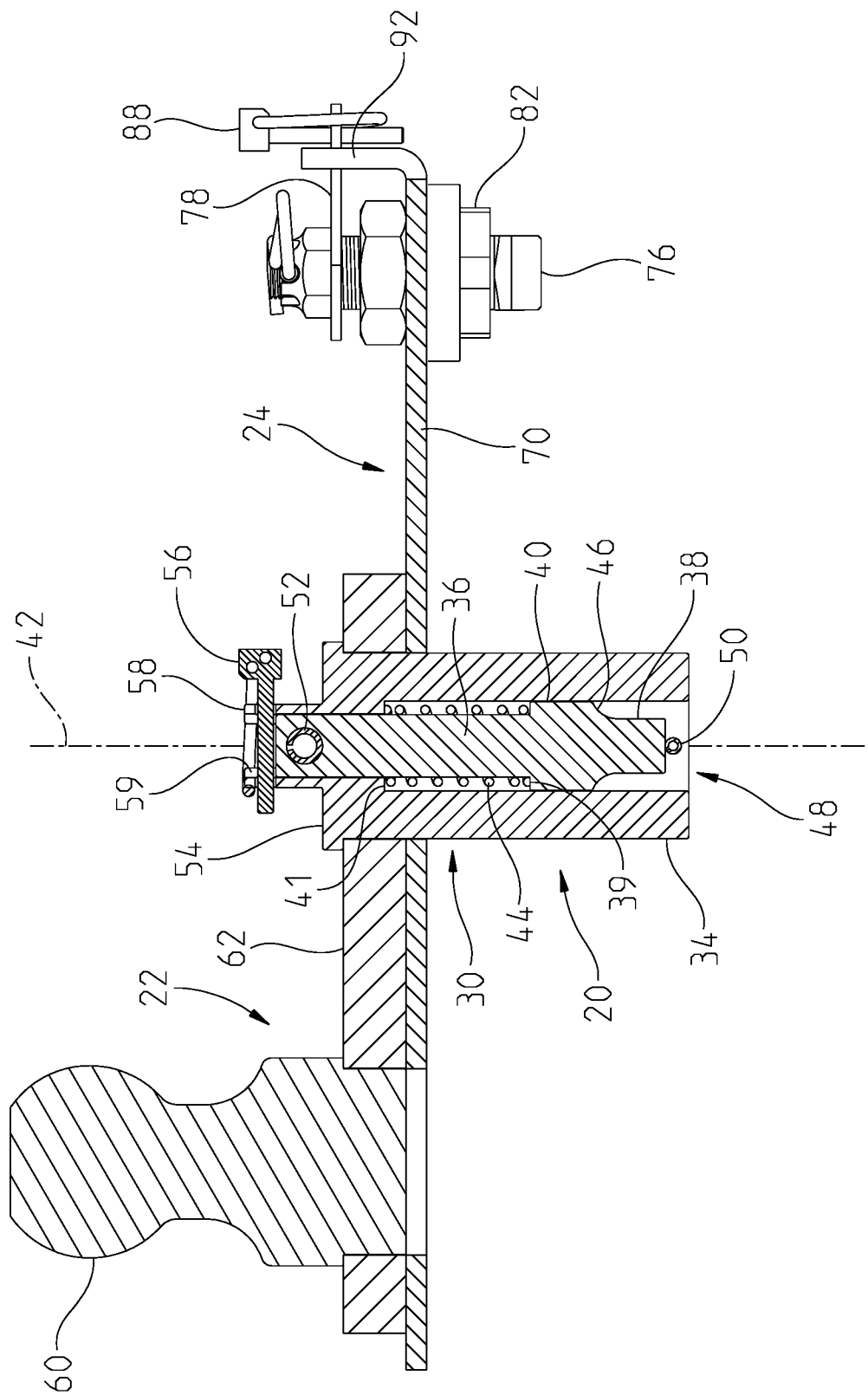
Figure 6:
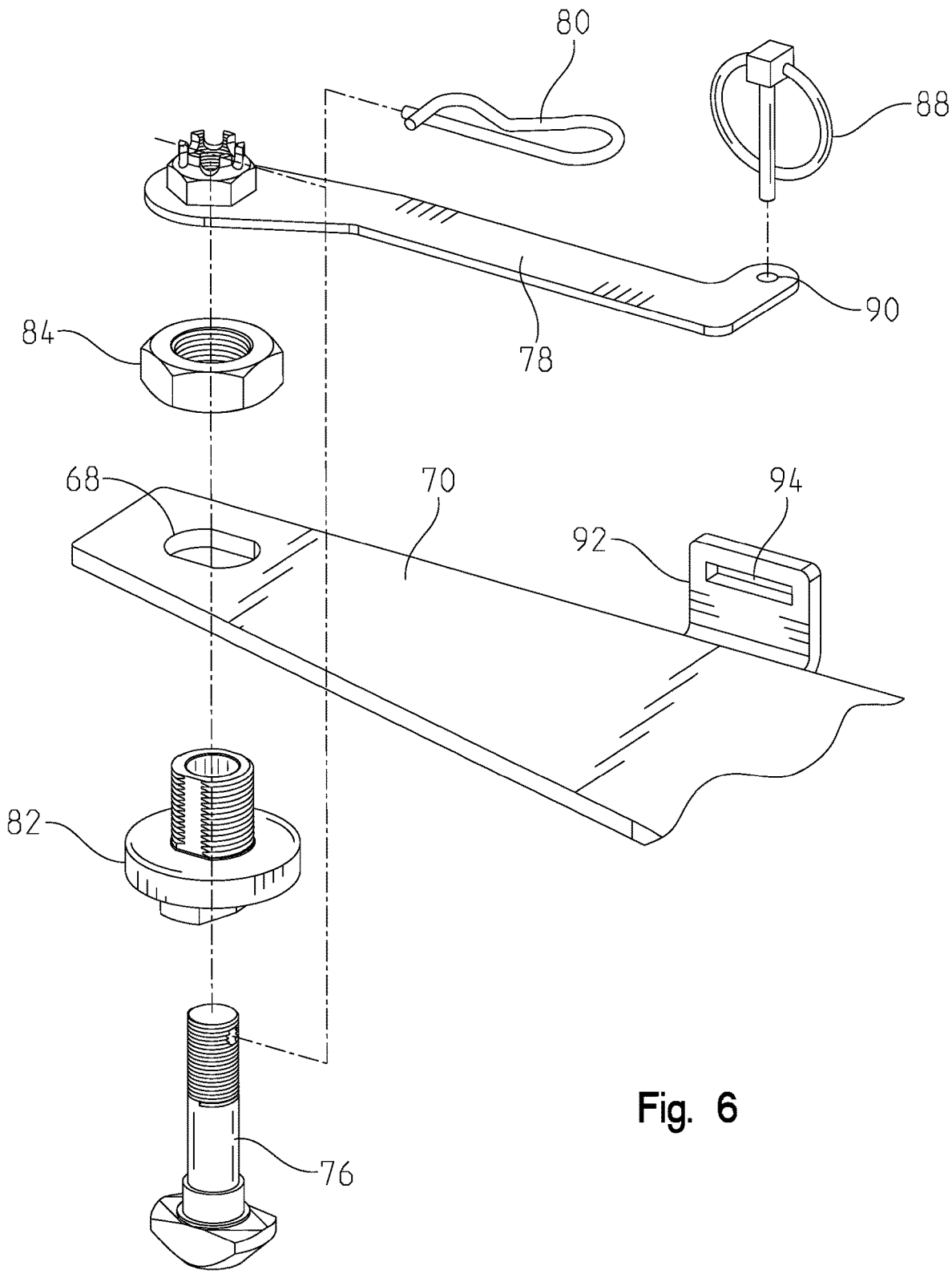

FIG. 1 is a top isometric view of the gooseneck puck extender;
FIG. 2 is a top view of the extender in FIG. 1;
FIG. 3 is a bottom view of the extender in FIG. 1;
FIG. 4 is a section view taken about line 4-4 in FIG. 2;
FIG. 5 is a section view taken about line 5-5 in FIG. 2;
FIG. 6 is an isometric exploded view of one side of the outrigger portion of the base plate; and
FIG. 7 is an isometric view of the device as being installed on a towing vehicle.

DESCRIPTION OF THE PREFERRED EMBODIMENT

A gooseneck puck extender 10 as shown in FIGS. 1-6 is designed to fit a truck having a puck system mounted under the truck bed 102 of a towing vehicle 100. The puck system has a center socket 104 and fore receivers 106 spaced from it, along with aft receivers 108. As shown in FIG. 7, the for receivers 106 are forward of the center socket 104 in the vehicle's driving direction, and the aft receivers 108 are rearward of the center socket 104. The spacing of the receivers 106, 108 to each other and to the center socket 104 can vary between vehicles, but the center socket 104 is typically centered over the rear axle of the truck and located between the fore receivers 106 and aft receivers 108. The puck extender 10 moves the attachment point for a trailer rearward from the center socket 104 by spacing the trailer attachment point rearward in the truck bed 102.

The puck extender 10 has a central connection portion 20, an offset gooseneck portion 22, and a base plate 70 that has an outrigger portion 24. The base plate 70 is a unitary and planar piece of steel that extends throughout the puck extender 10 and serves as a structural member to which all of the components are connected. The base plate 70 has an upper surface and a lower surface that define its thickness. The central connection portion 20 extends through the base plate 70 and is designed to securely mate with the center socket 104 on the vehicle. The base plate 70 completely circumscribes the central connection portion 20 and the central connection portion extends below the base plate 70. The connection between the base plate 70 and the central connection portion 20 is typically welded. The central connection portion 20 has a cylindrical shaft 30 with captured balls 32. As shown in FIG. 4, the captured balls 32 are diametrically opposed, but other configurations are possible, depending on the configuration of the center socket 104. The captured balls 32 can be moved from a retracted position to an extended position where a portion of each ball 32 extends beyond the cylindrical surface 34 of the cylindrical shaft 30. The captured balls 32 are moved to the extended position by a locking shaft 36. The locking shaft 36 has a minor diameter 38 and a major diameter 40 and is moveable along a vertical axis 42 between an unlocked position and a locked position. Depending on the position of the locking shaft 36 on the vertical axis 42, the major diameter 40 or minor diameter 38 is aligned with the captured balls 32. The captured balls 32 reside in apertures 28 that are narrowed nearest where they meet the cylindrical surface 34, which prevents the balls 32 from falling out. In the locked position, the major diameter 40 drives the balls 32 radially outward to the extended position, as shown in FIG. 4. In the unlocked position, the minor diameter 38 allows the balls 32 to retract and not extend beyond the cylindrical surface 34. The locking shaft 36, as shown, is spring-loaded with spring 44 urging the locking shaft 36 downwardly to the locked position. The spring 44 circumscribes the locking shaft 36 and is trapped between a shoulder 39 on the locking shaft 36 and an upper surface 41 that is internally located within the cylindrical shaft 30. The spring-loaded locking shaft 36 being biased toward the locked position creates a default situation of the central connection portion 20 being in a locked state and further prevents inadvertent bouncing of the locking shaft 36 from its locked position during travel. A ramped or radiused surface 46 connects the major diameter 40 to the minor diameter 38, which creates a smooth transition and acts as an inclined surface on which the balls 32 ride as the locking shaft 36 is moved axially between locked and unlocked positions. Movement of the locking shaft 36 is constrained by pins 50, 52, with pin 50 traversing a central aperture 48 in the cylindrical shaft 30. The central aperture 48 is sized to be just larger than the major diameter 40 to constrain the locking shaft 36 while still allowing it to slide freely along the vertical axis 42. Pin 52, also referred to as a release handle, rets on a top surface 54 in the locked position. The spring 44 biases the pin 52 against the top surface of the cylindrical shaft 30. The locking shaft 36 can be locked in the locked position with a lynch pin 56. Other types of locks are contemplated, such as a cotter pin, clevis pin, bolt, spring pin, or similar device.

An offset block 62 is affixed to and overlies the base plate 70 on the opposite side to which the central connection portion 20 extends. The offset block 22 serves as a significant structural reinforcement to the base plate adjacent to where the central connection portion 20 extends through the base plate 70. The offset gooseneck portion 22 of the base plate 70 has a gooseneck ball 60 affixed to the offset block 62. The offset block 62 extends around the cylindrical shaft 30 and serves as a strong connection between the gooseneck ball 60 and the cylindrical shaft 30 in addition to the base plate 70. The offset block 62 is made from structural material, such as thick metal, due to the forces from the gooseneck ball 60 that get transferred to the rest of the components and those forces being distributed through the base plate 70. It should be noted that the gooseneck ball 60 directly overlies and is in adjacent contact with the base plate through its reinforced connection through the offset block 22. The offset block 22 does not extend above the cylindrical shaft 30 and the offset block 62 is below the top surface 54 of the central shaft 30. This maintains a very low profile so there a minimal overturning torque exerted on the base plate 70 due to forces acting on the gooseneck ball 60. The base plate 70 sits directly upon the truck bed 102. In other words, the bottom of the gooseneck bell 60 is coplanar and overlapping in elevation with the upper portion of the cylindrical shaft 30 that is received by the center socket 104 in the towing vehicle 100. It is this overlapping elevation between a portion of the gooseneck ball 60 and the cylindrical shaft 30 that maintains the very low profile of the puck extender 10 of this invention. This imparts the most linear transfer of force possible through the base plate 70 so that forces am linearly transmitted and distributed amongst the puck locks 72, 74 and cylindrical shall 30. Any small amount of bending force that may result from the height of the gooseneck ball 60 extending above the base plate 70 solely by the amount of its own height is further supported by the broad flat lower surface of the base plate 70 contacting the truck bed 102. The broad flat surface of the base plate 70 minimizes stress and potential metal fatigue on the truck bed 102 because forces are so broadly distributed over the truck bed 102.

The outrigger portion 24 of the base plate 70 connects to puck locks 72, 74, the outrigger portion 24 is the expanse of the base plate 70 extending between the puck locks 72, 74. The puck locks 72, 74 are located outwardly and forward of the central connection portion 20. The puck locks 72, 74 are designed to mate with fore receivers 106. The outrigger portion 24 of the base plate 70 is designed to provide additional stability to the central connection portion 20. In this manner, the puck extender 10 of the present invention has three interlocking connections with the towing vehicle 104 when in use. The base plate 70 is secured to the central connection portion 20, commonly by welding to the offset block 62. The puck locks 72, 74 can be rotated between a locked position as shown in FIG. 1, and an unlocked position. Each puck lock 72, 74 has a T-shaped bolt 76 that rotates when a locking handle 78 rotates. The locking handle 78 is fixed to the T-shaped bolt 76 through a pin 80. The T-shaped bolt 76 is held to the outrigger portion 24 of the base plate 70 through a bushing 82. As shown, the bushing 82 has features designed to mate with receivers 106. Each bushing 82 is held to a base plate aperture 68 with a nut 84. The locking handles 78 can be retained in the locked position with a lynch pin 88 that extends through a pin aperture 90. In the locked position, a portion of the locking handle 78 that has the pin aperture 90 extends through an opening 94 located on a tab 92 in the base plate 70. This prevents vibration, shifting, or other forces from rotating the locking handle 78 may from the locked position. Although the tab 92 is shown, other locking features could be used instead of a tab 92 as long as such locking feature is able to restrain the locking handle 78 from leaving the locked position that is shown in FIG. 1.

To install the gooseneck puck extender 10, the user first removes any protective covers from the receivers 106 and center socket 104. If present, the user removes the lynch pins 88, 56. The user moves the locking handles 78 to the unlocked position for both puck locks 72, 74. The user also moves the locking shaft 36 by pulling up on the release handle 52 to move it to the unlocked position. This allows the captured balls 32 to retract inside the cylindrical shaft 30 and not extend beyond the cylindrical surface 34. While in the unlocked position, the user can rotate the locking shaft 36 (about the vertical axis 42) which allows the release handle 52 to rest on a shoulder 58, and thereby holding the locking shaft 36 in the unlocked position. The user then positions the puck extender 10 over the center socket 104 and receivers 106 and lowers the extender 10 until it is seated in the socket 104 and receivers. At that point, the user can then rotate the locking handles 78 to the locked position and install the lynch pins 88. The user can also move the locking shaft 36 to the locked position, either by releasing the release handle 52 or rotating it until it falls into a slot 59 in the shoulder 59. As the locking shaft 36 returns to the locked position, the balls 32 are driven towards the extended position by the radiused surface 46 and major surface 40. The user can then reinstall the lynch pin 56 so that the release handle 52 cannot leave the slot 59. If the user has not completely lowered the puck extender 10 or does not have the alignment correct, the locking shaft 36 is prevented from reaching the locked position due to interference of the balls 32 with part of the center socket 104. This prevents the user from installing the lynch pin 56 if alignment issues are present. The same is true for the puck locks 72, 74 which are not able to be rotated into the locked position unless the T-shaped bolts 76 are fully seated in their respective receivers 106. Thus, misaligned conditions have definite indicators that prevent a user from trying to use the puck extender 10 in a less than fully attached configuration. To remove the puck extender 10, the user removes the lynch pins 56, 88, rotates the locking handles to die unlocked position, and lifts up on the release handle 52. At that point, the extender 10 can be lifted off of the truck bed 102.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An offset gooseneck adapter for use with a towing vehicle puck system having a center socket and a receiver spaced from said center socket by a distance, said adapter comprising:
   a central connection portion having a cylindrical shaft with a cylindrical surface, said cylindrical shaft having a captured ball moveable between an extended position and a retracted position through movement of a locking shaft that is moveable on a vertical axis between a locked position and an unlocked position, said extended position of said ball defined by a portion of said captured ball displaced radially beyond said cylindrical surface by said locking shaft, said retracted position of said captured ball defined by said captured ball radially moveable to a position inside said cylindrical surface, said locking shaft having a major diameter and a minor diameter, said locked position of said locking shaft corresponding to said major diameter being aligned with said captured ball and said captured ball being in said extended position, said unlocked position corresponding to said minor diameter being aligned with said captured ball and said captured ball being movable towards said retracted position;
   a base frame affixed to said cylindrical shaft, said base frame having a bolt spaced from said cylindrical shaft by a distance equal to said distance between said center socket and said receiver, and
   a gooseneck ball affixed to said base frame and offset from said cylindrical shaft.

2. The offset gooseneck adapter of claim 1, wherein said bolt is T-shaped and rotatable between a locked position and an unlocked position, said bolt is selectively retainable in said locked position.

3. The offset gooseneck adapter of claim 1, further comprising a second bolt spaced from said cylindrical shaft by a distance equal to a second said distance between said center socket and a second said receiver.

4. The offset gooseneck adapter of claim 1, wherein said cylindrical shaft has a top surface and a shoulder spaced therefrom, said shoulder having a slot therein and extending toward said top surface of said cylindrical shaft, said locking shaft having a release handle, said release handle retained in said slot when said locking shaft is in said locked position.

5. The offset gooseneck adapter of claim 4, wherein said locking shaft is rotatable about said vertical axis in said unlocked position to retain said locking shaft in said unlocked position when said release handle rests upon said shoulder.

6. The offset gooseneck adapter of claim 1, wherein said locking shaft is biased towards said locked position by a spring.

7. An offset gooseneck adapter for use with a towing vehicle puck system having a center socket and a receiver spaced from said center socket by a distance, said adapter comprising:
   a central connection portion having a cylindrical shaft with a cylindrical surface, said cylindrical shaft having a captured ball moveable between an extended position and a retracted position through movement of a locking shaft that is moveable on a vertical axis between a locked position and an unlocked position, said extended position of said ball defined by a portion of said captured ball displaced radially beyond said cylindrical surface by said locking shaft, said retracted position defined by said captured ball being radially moveable to a position inside said cylindrical surface;
   a gooseneck ball affixed to said central connection portion and offset from said cylindrical shaft;
   a base frame affixed to said cylindrical shaft and having a locking feature; and
   a rotating lock having a T-shaped bolt and a locking handle affixed thereto, said rotating lock rotatable between a locked position and an unlocked position, said locking handle securable to said locking feature on said base frame in said locked position where said T-shaped bolt is spaced from said cylindrical shaft by a distance equal to said distance between said center socket and said receiver.

8. The offset gooseneck adapter of claim 7, further comprising a second rotating lock having a second locking handle affixed thereto, said second locking handle securable to a second said locking feature on said base frame in said locked position.

9. The offset gooseneck adapter of claim 7, wherein said locking shaft having a major diameter and a minor diameter, when said major diameter is aligned with said captured ball, said captured ball is in said extended position, when said minor diameter is aligned with said captured ball, said captured ball is movable towards said retracted position.

10. The offset gooseneck adapter of claim 7, wherein said cylindrical shaft has a top surface and a shoulder spaced therefrom, said shoulder having a slot therein and extending to said top surface of said cylindrical shaft, said locking shaft having a release handle, said release handle retained in said slot when mid locking shaft is in said locked position.

11. The offset gooseneck adapter of claim 10, wherein said locking shaft is rotatable about said vertical axis in said unlocked position to retain said locking shaft in said unlocked position when said release handle rests upon said shoulder.

12. The offset gooseneck adapter of claim 7, wherein said gooseneck ball is offset from said cylindrical shaft in an opposite direction from said rotating lock so that said cylindrical shaft is located between said rotating lock and said gooseneck ball within said base frame.

13. The offset gooseneck adapter of claim 7, wherein said locking shaft is biased towards said locked position by a spring located between a shoulder on said locking shaft and an upper surface within said cylindrical shaft.

14. The offset gooseneck adapter of claim 7, wherein said cylindrical shaft is locked to said center socket and said rotating lock is secured to said receiver, said gooseneck ball is affixed to said towing vehicle rearward of said center socket.

15. An offset gooseneck adapter for using with a towing vehicle having a center socket located over a rear axle and at least one receiver spaced from said center socket by a distance, said offset gooseneck adapter comprising:
  a cylindrical shaft for being received by said center socket, said cylindrical shaft selectively lockable to said center socket;
  an offset gooseneck portion fixed with respect to said cylindrical shat, said offset gooseneck portion having a gooseneck ball affixed thereto;
  a base frame connected to said offset gooseneck portion and having a locking feature;
  a rotating lock for being received by and lockable to said receiver, said rotating lock securable to said locking feature in a locked position spaced from said cylindrical shaft by a distance equal to said distance between said center socket and said receiver; and
  when said cylindrical shaft is locked to said center socket and said rotating lock is secured to said receiver, said gooseneck ball is affixed to said towing vehicle offset from said center socket.

16. He offset gooseneck adapter of claim 15, wherein said cylindrical shaft has a cylindrical surface, said cylindrical shaft having a captured ball moveable between an extended position and a retracted position through movement of a locking shaft, said locking shaft moveable on a vertical axis between a locked position and an unlocked position, said extended position of said captured ball defined by a portion of said captured ball displaced radially beyond said cylindrical surface by said locking shaft, said retracted position of said captured ball defined by said captured ball radially moveable to a position inside said cylindrical surface.

17. The offset gooseneck adapter of claim 16, further comprising a second captured ball diametrically opposed to said captured ball, said locking shaft located between said captured balls.

18. The offset gooseneck adapter of claim 15, wherein said rotating lock has a T-shaped boll for being secured to said receiver when said rotating lock is located in said receiver and rotated to said locked position, said rotating lock having a locking handle fixed with respect to said T-shaped bolt and rotatable therewith.

19. The offset gooseneck adapter of claim 15, wherein said cylindrical shaft has a top surface and a shoulder spaced therefrom, said shoulder having a slot therein and extending to said top surface of said cylindrical shaft, said locking shaft having a release handle, said release handle retained in said slot when said locking shaft is in said locked position, said locking shaft being rotatable in said unlocked position to retain said locking shaft in said unlocked position when said release handle rests upon said shoulder.

* * * * *